US007817605B2

(12) United States Patent
Liu

(10) Patent No.: US 7,817,605 B2
(45) Date of Patent: Oct. 19, 2010

(54) METHOD OF TRANSMITTING CONTROL SIGNALS FOR UPLINK TRANSMISSION IN COMMUNICATION SYSTEMS

(75) Inventor: Jung-Tao Liu, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1167 days.

(21) Appl. No.: 10/645,545

(22) Filed: Aug. 22, 2003

(65) Prior Publication Data

US 2005/0041694 A1 Feb. 24, 2005

(51) Int. Cl.
*H04B 7/212* (2006.01)

(52) U.S. Cl. .................. 370/337; 370/349; 370/312; 370/347

(58) Field of Classification Search .................. 370/349, 370/329, 312, 328, 336, 337, 345, 347
See application file for complete search history.

(56) References Cited

U.S. PATENT DOCUMENTS 6,504,821 B2 * 1/2003 Berger .................. 370/236.1
7,054,293 B2 * 5/2006 Tiedemann et al. ......... 370/335
7,088,683 B2 * 8/2006 Sawada et al. .............. 370/252
7,092,373 B2 * 8/2006 Parantainen et al. ........ 370/337
7,120,134 B2 * 10/2006 Tiedemann et al. ......... 370/329
7,146,174 B2 * 12/2006 Gardner et al. ............. 455/453
7,164,654 B2 * 1/2007 Hunzinger et al. .......... 370/230
7,218,623 B1 * 5/2007 Proctor, Jr. ................. 370/335
7,356,005 B2 * 4/2008 Derryberry et al. ......... 370/335
7,539,165 B2 * 5/2009 Toskala et al. .............. 370/335

* cited by examiner

*Primary Examiner*—Ricky Ngo
*Assistant Examiner*—Chandrahas Patel
(74) *Attorney, Agent, or Firm*—Harness, Dickey & Pierce

(57) ABSTRACT

In a method of transmitting control signals for uplink transmission of packet data, a control channel carrying control signal data that is shared by a plurality of users is transmitted in the downlink to the users. The shared control channel includes fields identifiable by, or specified for, different ones of the users, so that each field includes control signal data for a specified user for uplink transmission of packet data. The specified user decodes a corresponding field of the shared control channel to interpret the control signal data, and may transmit packet data in the uplink in accordance with the decoded control signal data.

20 Claims, 2 Drawing Sheets

METHOD OF TRANSMITTING CONTROL SIGNALS FOR UPLINK TRANSMISSION IN COMMUNICATION SYSTEMS

BACKGROUND OF THE INVENTION

1. Field of the Invention

The present invention relates to transmitting a control channel shared by a plurality of users for uplink transmission in a communication system, and uplink transmission of packet data based on receipt of the control channel.

2. Description of Related Art

Expanded efforts are underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Standardizing bodies such as the 3rd Generation Partnership Project (3GPP and 3GPP2), a body which drafts technical specifications for the UMTS standard and other cellular technologies, have introduced several advanced technologies in an effort to ensure that any associated control information is carried in an efficient manner. Certain advanced or enabling technologies may include fast scheduling, Adaptive Modulation and Coding (AMC) and Hybrid Automatic Repeat Request (HARQ) technologies. These technologies have been introduced in an effort to improve overall system capacity. In general, a scheduler or scheduling function at a Node B (base station) selects a UE (mobile station) for transmission at a given time, and adaptive modulation and coding allows selection of the appropriate transport format (modulation and coding) for the current channel conditions seen by the UE.

AMC technologies enable a selection of a data rate and a transmission format (i.e., modulation level and channel coding rate) that best "suits" the scheduled user's prevailing channel conditions. Delays and measurement errors result in degraded performance from AMC.

HARQ allows combining of the original transmission with the new transmission, rather than to discard the original transmission. This may greatly improve the probability of correct decoding of the packet. The word "hybrid" in HARQ indicates that Forward Error Correction (FEC) techniques have been used in addition to ARQ techniques. Accordingly, HARQ helps to ensure that transmissions resulting in unsuccessful decoding, by themselves, are not wasted.

While much of the standardization to date has focused on the downlink (forward link from Node B/base station to UE/mobile station), similar enhancements are now being considered for the uplink (reverse link). Further evolution of 3G standards include enhanced uplink (EU) features to support high-speed reverse link packet access (uplink from mobile station to base station). Many of the techniques used in the forward link (i.e., fast scheduling, AMC, HARQ, etc.) may also be usable on the reverse link, so as to improve data rates and system capacity, for example.

In order to enable some of the above-mentioned technologies, control signaling is utilized on the uplink and downlink. The uplink signaling typically consists of ACK/NACK feedback for HARQ operation and channel quality indication (CQI), so that the UE can tell the Node B whether a previously transmission was received. The uplink signaling is carried over a physical channel known as a dedicated physical control channel (DPCCH). For downlink signaling, a shared control channel (SCCH) is used to carry scheduling and HARQ control information for a current transmission to the UE to process a corresponding data transmission, and/or to specify UE transmit rate for uplink transmissions of high speed data, for example. For supporting high speed data, the SCCH is known as a high speed shared control channel (HS-SCCH), as specified by the High Speed Downlink Packet Access specification (HSPDA) for UMTS.

One set of issues being addressed by 3GPP includes design considerations for control or signaling channels to conserve radio resources and to reduce the amount of interference or traffic in the uplink. Control or signaling information that is transmitted via a SCCH is typically encoded, e.g., with block codes or convolutional codes. As such, a UE must decode all the information in the SCCH in order to decode a signaling message that is then used for processing the corresponding data transmission from the Node B over a corresponding downlink shared channel (DSCH).

By way of example, signaling or control information in the SCCHs can include transmission format information such as code information (which codes are used for the data transmission), modulation information, Transport Block Size (TBS), and so on. The SCCHs are used on a shared basis among all the UEs such that each UE in a cell would read all the SCCHs transmitted in the downlink from a wireless network serving the UEs. Since a UE must decode and evaluate control data from a plurality of SCCHs received in the downlink, radio resources are being wasted, as the total number of bits the UE must process is a processing burden. The amount of data sent over these SCCHs thus taxes downlink bandwidth. Additionally, clogging in the uplink may occur as a UE transmits responses to control or signaling data it has decoded from several SCCHs.

SUMMARY OF THE INVENTION

Exemplary embodiments of the present invention are directed to a method of transmitting control signals for uplink transmission of packet data in a wireless communication system or network. In the method, a control channel shared by a plurality of users is transmitted over the downlink to the users. The shared control channel includes fields identifiable by, or specified for, different ones of the users, so that each field includes control signal data for a specified user for uplink transmission of the packet data. The specified user decodes a corresponding field of the shared control channel to interpret the control signal data, and may transmit packet data in the uplink in accordance with the decoded control signal data.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention and wherein.

DETAILED DESCRIPTION OF EXEMPLARY EMBODIMENTS

Figure 1:
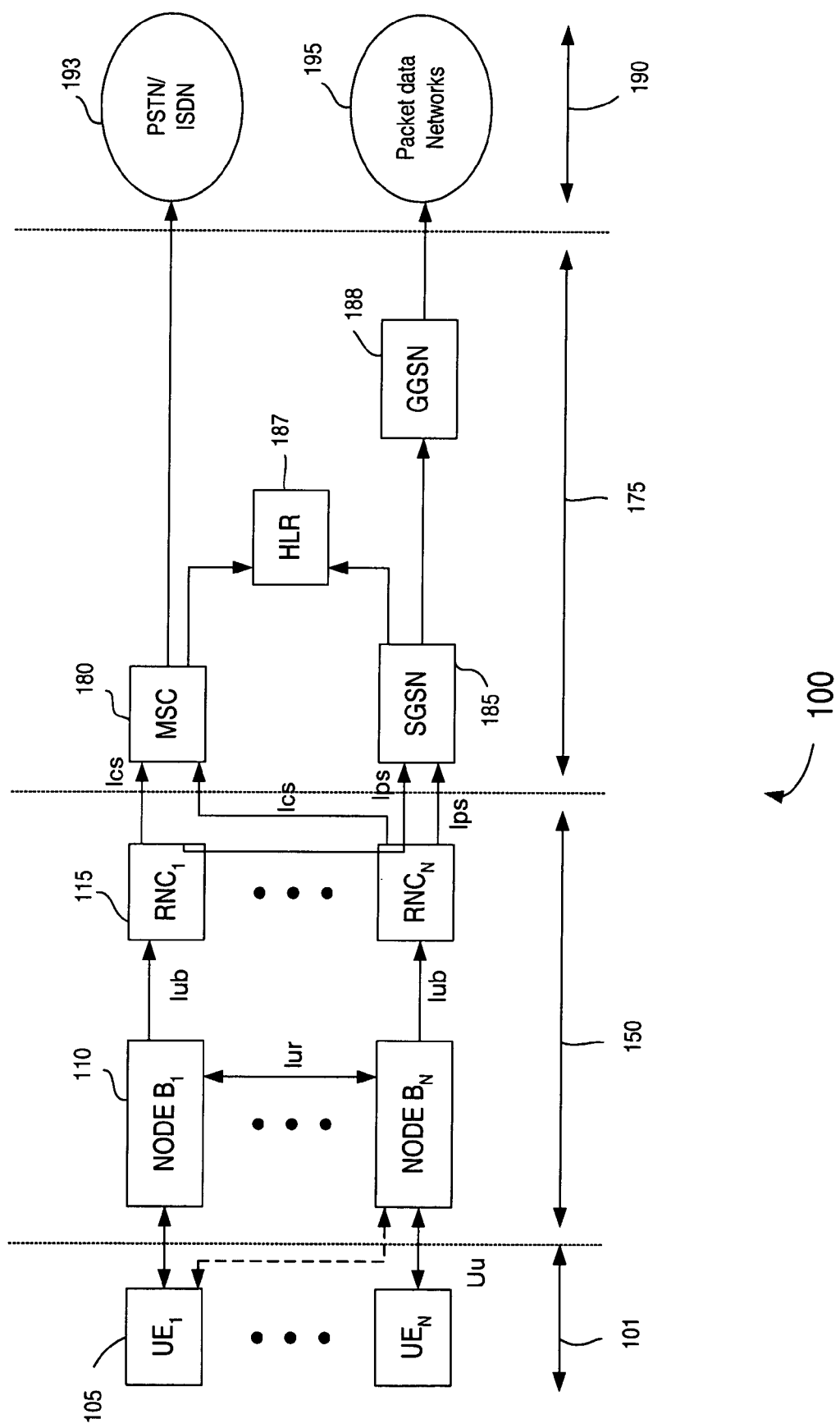
FIG. 1 illustrates a high-level diagram of the UMTS architecture in accordance with an exemplary embodiment of the invention.

Although the following description of the present invention is based on the Universal Mobile Telecommunications System (UMTS) network infrastructure implementing a next generation Wideband Code Division Multiple Access (W-CDMA) air interface technology, the exemplary embodiments shown and described herein are meant to be illustrative only and not limiting in any way. As such, various modifications will be apparent to those skilled in the art. For example, it will be understood that the present invention finds application to other spread spectrum systems such as CDMA2000 systems.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile station and remote station are synonymous and describe a remote user of wireless resources in a wireless communication network.

In general, the exemplary embodiments of the present invention are directed to a method of transmitting control signal data for uplink transmission of packet data, and a method for uplink transmission of packet data (such as high speed data) based on the control signal data. In an aspect, a control channel used for carrying control signal data for uplink transmission of packet data is transmitted in the downlink, to be shared by a plurality of users. This 'shared' control channel may be shared by up to N users at the same time instant, which may conserve downlink bandwidth.

The shared control channel may also be used to support packet data users or high-speed data users in soft handoff (SHO). Soft handoff is a process by which a UE can communicate simultaneously with several Node Bs, when the UE is in the coverage area of those Node Bs. In UMTS, a UE maintains an 'active set', or a set that keeps track of how many communication links there are between the UE and the Node Bs. If there is more than one 'leg' (a communication link) in the active set, the UE is in SHO (since the UE is communicating with multiple Node Bs). Adding a leg means adding a communication link to the active set. A UE 'exits the SHO' if there is only one leg left in its active set (of course, the UE would experience a call drop if there is no leg in its active set).

In UMTS, the Node Bs are not synchronized between each other, so when a UE enters SHO, there is a need to ensure that multiple legs arrive at the UE at the same timing, so that the UE knows that all links received at the same time (actually within a window of arrival time) carry the same information. Without synchronization, SHO cannot be implemented.

Thus, the exemplary embodiments of the present invention introduce a shared control channel for carrying control signal data in the downlink to a plurality of users. The shared control channel may hereafter be referred to as an Enhanced Uplink Rate Controlled Signaling Channel (EU-RCSCH). The EU-RCSCH is envisioned for enhanced uplink (EU) features to support high-speed reverse link packet access in UMTS, although the exemplary embodiments are not limited for application to just high-speed reverse link packet access in UMTS.

The EU-RCSCH is a physical channel. In general, physical channels are defined by a specific carrier frequency, scrambling code, channelization code (optional), time start & stop (giving a duration) and, on the uplink, relative phase (0 or $\pi/2$). Time durations are defined by start and stop instants, measured in integer multiples of chips. Suitable multiples of chips include a radio frame, a slot (known also as a timeslot) and a sub-frame. A radio frame is a processing duration which consists of 15 slots. The length of a radio frame corresponds to 38400 chips. A slot is a duration which consists of fields containing bits. The length of a slot corresponds to 2560 chips. In general, a sub-frame is a basic time interval for a HS-DSCH transmission and HS-DSCH-related signaling at the physical layer. The length of a sub-frame typically corresponds to 3 slots (7680 chips).

The EU-RCSCH may be embodied as a sub-frame, each sub-frame including a plurality of slots, each slot including one of more fields. Each field may include first and second indicators. The first indicator may be embodied as acknowledgment (ACK) and/or negative acknowledgment (NACK) data indicating whether a previous transmitted packet was received by the Node B. The second indicator may be referred to as a Transport Format Limit Indicator (TFLI). A TFLI represents an upper bound or limit for a transmit rate, and may inform the UE whether or not to adjust its transmit rate, and in which direction (raise transmit power, lower transmit power, maintain transmit power). Since the EU-RCSCH is shared by a plurality of UEs, a UE only needs to decode one field of one UE, instead of all fields of a plurality of shared control channels, potentially conserving downlink bandwidth.

FIG. 1 illustrates a high-level diagram of the UMTS architecture, in accordance with an exemplary embodiment of the invention. This UMTS architecture is provided merely as an exemplary network or system architecture, it being understood that the EU-RCSCH could be applicable to other spread spectrum systems such as CDMA2000 systems.

Referring to FIG. 1, a UMTS architecture 100 comprises a radio access network part that may be referred to as a UMTS terrestrial radio access network (UTRAN) 150. The UTRAN 150 interfaces over a Uu air interface with a radio interface part 101; namely user equipments (UEs) such as mobile stations. The Uu air interface is the radio interface between the UTRAN 150 and one or more UEs 105. The UTRAN 150 also interfaces with one or more core networks (CNs) 175 (only one being shown in FIG. 1 for simplicity) via interfaces Ics and Ips, for example. Ics, short for Interface Unit (Circuit Switched) interface, is the interface in UMTS which links the RNC with a Mobile Switching Center (MSC). Ips, short for Interface Unit (Packet Switched) interface, is the interface in UMTS which links the RNC with a Serving GPRS Support Node (SGSN). The Uu air interface enables interconnection of Node Bs with UEs, for example.

CN 175 may include mobile switching centers (MSCS) 180, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the UTRAN, and also exchange packets with other internet protocol (IP) networks, referred to herein as "packet data networks". External networks 190 may include various circuit networks 193 such as a packet Switched Telephone Network (PSTN) or Integrated Service Digital Network (ISDN) and packet data networks 195. UTRAN 150 may also be linked to the CN 175 via back-haul facilities (not shown) such as T1/E1, STM-x, etc., for example.

The UTRAN 150 may include cell sites, called Node Bs 110, which may serve a group of UEs 105, generally using a Uu interface protocol. A Node B 110 may contain radio transceivers that communicate using Iub protocol with radio network controllers (RNCs) 115 in UTRAN 150. RNCs 115 within UTRAN 150 may communicate with each other using an Iur protocol, for example. The Iur air interface is a subset of the Iu interface that enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

CN 175 may include mobile switching centers (MSCS) 180, home location registers (HLR) 187, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the UTRAN, and also exchange packets with other interne protocol (IP) networks, referred to herein as "packet data networks". External networks 190 may include various circuit networks 193 such as a packet Switched Telephone Network (PSTN) or Integrated Service Digital Network (ISDN) and packet data networks 195. UTRAN 150 may also be linked to the CN 175 via back-haul facilities (not shown) such as T1/E1, STM-x, etc., for example.

Each sub-frame 200 comprises three slots 210 (Slot 0, Slot 1 and Slot 2), each of a duration ($T_{slot}$) 0.667 ms each ($T_{slot}$=2560 chips=0.667 ms, $2*10*k$ bits (k=256/SF)). Although not shown, control signal data in each slot 210 may be transmitted over multiple channelization code slots. The EU-RCSCH uses a channelization code of spreading factor (SF) 128. With QPSK modulation and a chip rate of 3.84 Mc/s in UMTS, up to 40 bits may be transmitted in a single slot 210, or a total of 20 bits over the 2 ms TTI of the sub-frame 200.

Figure 2:
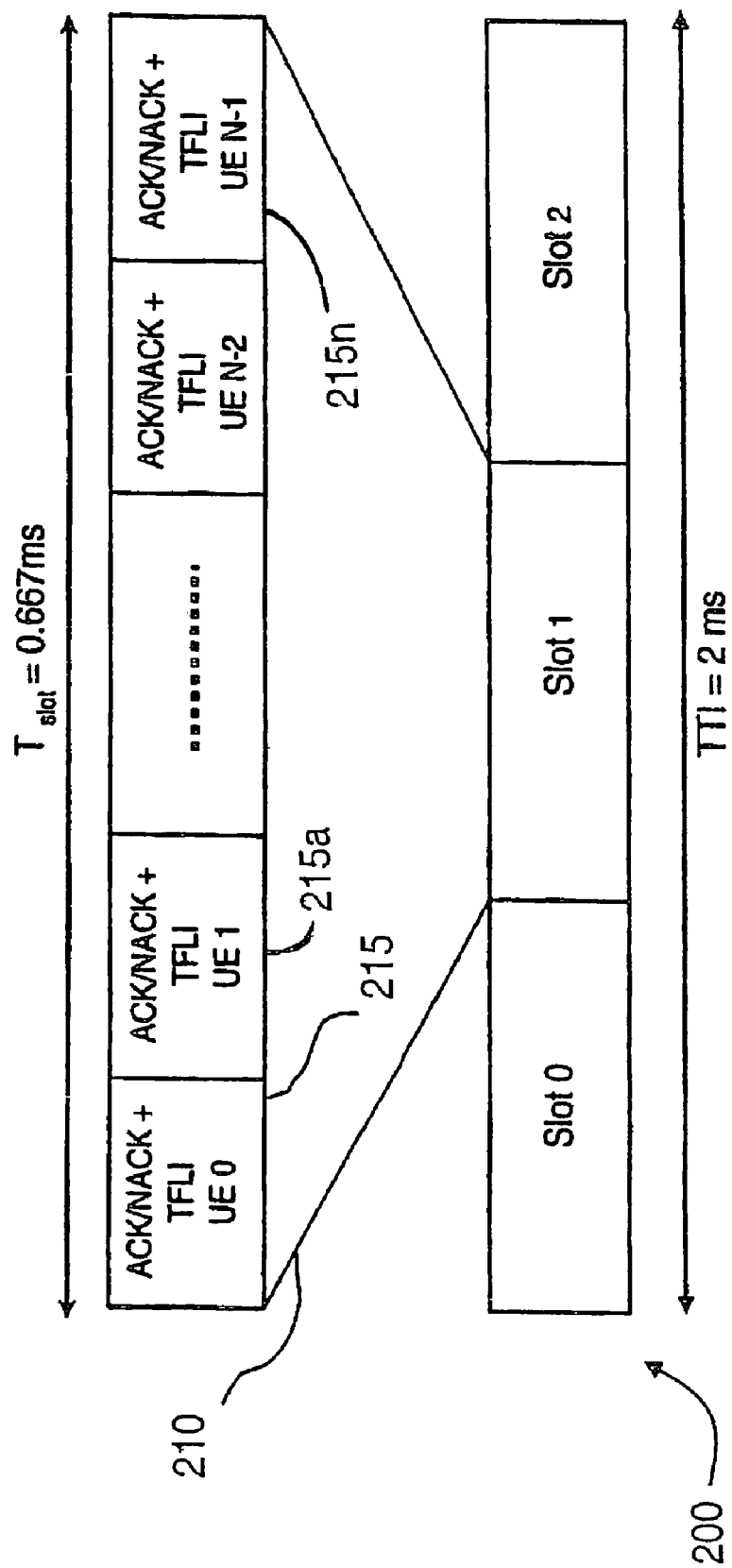
FIG. 2 illustrates an exemplary structure of an EU-RCSCH sub-frame in accordance with the exemplary embodiments of the invention.

In FIG. 2, Slot 1 is shown in exploded view and includes a plurality of fields 215. Each field specifies a particular UE; thus the EU-RCSCH is shared by a plurality of UEs 105. As discussed above, UE 105 only needs to decode one field 215 of one UE 105, instead of all fields of a plurality of shared control channels, potentially conserving downlink bandwidth.

Each field 215a ... 215n may include ACK/NACK data (e.g., command) indicating whether a previous transmitted packet was received by a UE 105, and indicator data. The indicator data may be referred to as a Transport Format Limit Indicator (TFLI). The TFLI specifies a maximum allowable transmit rate and informs the UE 105 whether or not to adjust its transmit rate, and in which direction (raise transmit power, lower transmit power, maintain transmit power).

The TFLI may represent and upper bound or maximum allowable transmit rate for rats specified as part of a Transport Format Combination Set (TFCS). In the enhanced uplink, there may only be one rate inside each rate combination. That is, in the present uplink dedicated channel (DCH), there is a set of rate combinations defined by the UTRAN 150 for a particular UE 105 to support multiple services (streaming video, voice, etc). These different rate combinations require a TFCS. In the case of enhanced uplink, the UE may have only one rate specified. The TFLI indicates an upper limit on the maximum allowed transport format (and hence transmit rate) specified by the TFCS.

The TFLI may be further monitored by all the Node Bs in the UE's active set. All Node Bs in the active set of a given UE can signal to move the TFLI up or down, or remain unchanged. A UE, when receiving multiple TFLIs, should select the TFLI that requires the lowest amount of power to transmit. This is to ensure that the UE is not causing excessive interference to some of the Node Bs in its active set.

The TFLI may represent and upper bound or maximum allowable transmit rate for rates specified as part of a Transport Format Combination Set (TFCS). In the enhanced uplink, there may only be one rate inside each rate combination. That is, in the present uplink dedicated channel (DCH), there is a set of rate combinations defined by the UTRAN 150 for a particular UE 105 to support multiple services (streaming video, voice, etc). These different rate combinations require a TFCS. In the case of enhanced uplink, the UE may have only one rate specified. The TFLI indicates an upper limit on the maximum allowed transport format (and hence transmit rate) specified by the TFCS.

No signaling on the downlink may be needed to support additional pilot boost/de-boost at the UE. Additionally, HARQ related information can be greatly reduced if an extreme rate-controlled mode is used, i.e. the UE interprets the rate limitation specified by the current TFLI as the only allowable rate on the uplink; hence, there is no need to signal transport block size (TBS) and transport format on the uplink.

Although the exemplary sub-frame size for a EU-RCSCH in FIG. 2 has been described as three slots, the sub-frame 200 could be N slots (N≧1). Each UE 105 listens to its assigned field 215 every Nth slot to decode the UE's specified signaling message.

Rate-Controlled Transmission Mode

The EU-RCSCH is used on the downlink for UEs 105 that are in what is referred to as a 'rate-controlled' transmission mode. Two transmission modes of operation proposed for the uplink direction include: (a) a scheduled transmission mode; and (b) a rate-controlled mode, sometimes referred to as an autonomous transmission mode. In a scheduled mode of operation, the Node B 110 determines which UEs 105 transmit on the uplink, start times for the UEs 105 and duration of transmissions. The Node B 110 would typically do this based on some knowledge of the UE 105's buffer status (amount of data waiting) and available transmit power. Additionally, a scheduler at the Node B 110 would estimate the channel for each UE 105 and the amount of "headroom" or margin available to the RoT threshold, in determining which UEs 105 can transmit and at what rate (or equivalently at what transmit power). Rise Over Thermal (or RoT) represents a total received transmit power normalized by the thermal noise and is a constraint on the uplink, thus RoT should be below a certain threshold. Scheduling and/or rate selection algorithms should work within this constraint.

In the rate-controlled mode, the Node B 110 does not explicitly determine which UEs 105 transmit on the uplink, start times and durations. In the rate-controlled mode, the Node B 110 would typically specify an allowed data rate (such as maximum allowable transmit rate), either per UE 105 or for all UEs 105, for example, based on dynamic RoT variations. The UEs 105 can then transmit autonomously, but are subject to guidelines or rules such as the allowed rates specified by the Node B 110.

Although the scheduled mode may allow for reduced latencies in transmission time and rate control, exploitation of fast channel quality variations, and perhaps more precise control of the RoT and consequently, much better efficiency for a given constraint on the RoT, there are drawbacks with the scheduled mode. Scheduling UEs 105 in soft handoff (SHO) without any coordination between Node B 110s in the active set (i.e. Node B's 110 that will decode its data) could lead to RoT violations that may significantly impact other power controlled channels. For example, consider a UE 105 in soft handoff with two Node B 110s (#1 and #2). The UE 105 may be scheduled by Node B 110 #1 to transmit at rate R1. Without any coordination, Node B 110 #1 may only be using its "headroom" or margin to the RoT constraint to determine R1. Node B 110 #2 may schedule some other user in its cell, completely unaware that UE 105 will transmit at rate R1 and cause additional and unpredictable interference to the user.

Additionally, fast coordination (i.e. exchange of information between Node B 110s in the active set to ascertain which UE 105 each Node B 110 is scheduling and at what rate) is not considered feasible with the present architecture. This is because the only way the Node B 110s can communicate with each other is through the RNC 115 of the UTRAN 150. The delay associated with this process is much longer than the typical scheduling intervals, the former being of the order of 100 ms, while the latter being of the order of 10 ms or lower. Thus, uncoordinated scheduling of UEs 105 in SHO can result in RoT threshold violations, or alternatively, Node Bs 110 will have to be very conservative in their usage of the available "headroom". The former approach can cause degradation in performance for voice users, while the latter would result in inefficient use of uplink capacity.

Furthermore, if the UE 105 simply follows the scheduling command of either Node B 110, then the active set Node Bs 110 for the UE 105 that does not schedule the user will not attempt to decode its data. Therefore, the UE 105 transmission in the uplink will not derive the benefit of selection diversity (also known as macrodiversity). Some of these problems may be alleviated if the Node Bs 110 are made aware of the SHO state of each UE 105, so as to factor this into Node B 110 scheduling decisions.

Accordingly, the exemplary embodiments of the present invention envision transmitting the EU-RCSCH to support UEs 105 configured in a rate-controlled transmission mode and in SHO with multiple Node Bs. Advantages of the rate-controlled mode of transmission may be at least two-fold. Firstly, when only a small amount of data needs to be sent (e.g. TCPs, ACKs or HTTP requests, for example) the latency and signaling overhead associated with the scheduled mode may be excessive. Secondly, in SHO, all Node Bs 110 are aware that the UE 105 can transmit at any time and therefore will attempt to decode the data. Therefore the UE 105 can derive the benefit of selection diversity. In selection diversity, each Node B 110 will decode the user's data and send it to the RNC 115. The RNC 115 will "select" the replica that passed a cyclic redundancy code (CRC) error check or equivalent frame quality test. Thus, the UE 105's uplink transmission may derive the benefit of diversity.

Independent Power Control

As illustrated in FIG. 2, each field 215 designates a specific UE 105. In accordance with the exemplary embodiments, each UE 105 individually power controls its designated field 215 using the latest transmit power control (TPC) from the uplink dedicated physical control channel (UL-DPCCH). Each UE 105 thus monitors a given field 215 within the given EU-RCSCH for its downlink ACK/NACK command and TFLI. Accordingly, each UE-specific field 215 is power controlled by the specified UE 105, together with that UE 105's DL-DPCH (Downlink Dedicated Physical Channel) to ensure reliable reception.

Field Assignment at Call Setup

As illustrated in FIG. 2, the EU-RCSCH may be divided into fields 215 with fixed length. Each UE is assigned a particular field 215 with a specific channelization code (known as an OVSF code) during call setup. A call setup is a hand-shaking procedure defined by the standard for the UE 105. The call setup enables the UE 105 to get synchronized with the serving Node B 110 and RNC 115 of UTRAN 150, to exchange information, service requests, etc, between the UE 105 and Node B 110/RNC 115, and to establish dedicated physical channels (DPCHs) on the uplink and downlink for further communications. Once the call setup is complete, the UE is connected to the network and regular communications may occur.

Generally, the RNC 115 assigns fields to the UEs 105. In particular, the field 215 within a slot 210 of the EU-RCSCH sub-frame 200 that a UE 105 is to listen to may be assigned directly by the RNC 115 serving the UE 105. Accordingly, since this is done at call setup, the field 215 is assigned in advance of receiving the EU-RCSCH. RNC 115 may be configured to modify fields as necessary due to changing channel conditions, for example. Alternatively, a Node B may be configured to assign fields, and also configured to modify fields as necessary due to channel conditions, for example. This also may be done during call setup.

The UE 105 may need to listen to different fields in different EU-RCSCHs. But, since each slot 210 of the EU-RCSCH arrives at the same time, the EU-RCSCH is synchronized to the slot boundary. For example, a UE 105 may be listening to field number 2 on one EU-RCSCH, while listening to field number 10 on another EU-RCSCH. The UE 105 will process each such field every slot 210. Thus, the UE 105 can decode the correct field to interpret the ACK/NACK and TFLI data. Accordingly, each UE will monitor the given field within the given EU-RCSCH for its downlink ACK/NACK and transport format indication. Additionally, each UE-specific field 215 is power controlled together with that UE 105's DL-DPCH (Downlink Dedicated Physical Channel) to ensure reliable reception.

Bit Allocations and Interpretation

The following UE specific bit allocations are suggested for the control signaling carried on the EU-RCSCH: (a) ACK/NACK—1 bit; (b) Transport format limit indicator (TFLI)—1 bit. If the UE 105, upon decoding the specified field 215 to evaluate the signaling message, receives a value of 1 for the ACK/NACK field, the lastest uplink transmission by the UE 105 is considered received by the Node B 110. The UE 105 may proceed to transmit another data packet. If the UE 105 receives a 0, the UE 105 will re-transmit the previous packet (partially or entirely). In the case of SHO, the UE 105 receives multiple ACK/NACK commands from multiple EU-RCSCH. The UE 105 will interpret the command using OR. That is if one Node B 110 ACKs, then the packet is considered received by the Node B 110. To conserve the EU-RCSCH bandwidth, the TFLI field is allocated 1 bit. The values in the decoded bit fields may be interpreted by UE 105 as shown in Table 1 below.

TABLE 1

Interpretation of the TFLI field for 1-bit case

| ACK/NACK field | TFLI field | Interpretation |
| --- | --- | --- |
| 1 | 1 | Do no move TFLI |
| 1 | 0 | Move TFLI down by $\Delta$ |
| 0 | 1 | Move TFLI up by $\Delta$ |
| 0 | 0 | Move TFLI down by $\Delta$ |

Referring to Table 1, $\Delta$ represents a step size at which transmit rate (e.g., power for uplink transmission) may be adjusted, The step size may be signaled by a higher network layer (e.g., one of OSI layers 3-7) during call setup. A UE 105 receiving multiple commands in SHO from all Node Bs 110 in the active set may apply the following rules when adjusting the TFLI:

(a) when one of the received commands indicates moving the TFLI down, then the UE 105 moves TFLI down by Δ; or (b) when all received commands indicate moving TFLI up, then the UE 105 moves TFLI up by Δ; or (c) when some commands indicate "do not move" and other commands indicate "move up", the majority rule shall apply.

The above rules are exemplary, other rules could be implemented based on the desired implementation. Also, in SHO, when receiving an ACK from any of the Node B 110 in its active set, the UE 105 considers the packet received and flushs it out from the transmit buffer. The granularity of the TFLI field can be increase to 2 bits to allow different step sizes in moving the TFLI. The trade-off between the reduction on the noise rise (maintaining below the RoT threshold) due to faster reaction from the UE 105 and the performance loss due to increased EU-RCSCH errors should be evaluated. When in SHO, a set of rules similar to the 1-bit case may be devised for combining multiple TFLI commands, as exemplified by Table 2.

TABLE 2

Interpretation of the TFLI field for 2-bit case

| ACK/NACK field | TFLI field | Interpretation |
|---|---|---|
| 1 | 11 | Move TFLI up by Δ |
| 1 | 10 | Do not move TFLI |
| 1 | 01 | Move TFLI down by Δ |
| 1 | 00 | Move TFLI down by 2 Δ |
| 0 | 11 | Move TFLI up by 2 Δ |
| 0 | 10 | Move TFLI up by Δ |
| 0 | 01 | Do not move TFLI |
| 0 | 00 | Move TFLI down by Δ |

Although bit allocations of the ACK/NACK and TFLI fields have been described as 1-bit integers, the bit allocations could be N-bit values, N representing a positive integer greater than 1. Alternatively, bit allocations for the ACK/NACK and TFLI fields could be different positive integers.

HS-SCCH vs. EU-RCSCH

There are several differences between the EU-RCSCH and the current HS-SCCH specified by the 3GPP standardizing bodies. Firstly, for an HS-SCCH, per UE, signaling message size (the size of an HS-SCCH sub-frame) is 3 time slots, or an entire sub-frame. For EU-RCSCH, each control signaling message size (per UE) is less than one slot. Multiple UEs share that one slot. Secondly, multiple HS-SCCHs must be monitored by multiple UEs. For an EU-RCSCH, each UE listens to one field of one such shared control channel. This eases the workload of the UE, since the UE doesn't have to guess where the signaling is coming from. Thirdly, an HS-SCCH is power controlled on a sub-frame by sub-frame basis to the target UEs. The EU-RCSCH is power controlled on a field-by-field basis (each field is smaller than 1 time slot). Finally, an EU-RCSCH can support SHO, since a UE only needs to monitor one such channel from one Node B. During SHO, the UE may monitor multiple EU-RCSCHs (one from each Node B) that the UE is an SHO with. An HS-SCCH cannot support SHO, since a UE cannot simultaneously monitor multiple HS-SCCHs from one Node B, while monitoring a different set of HS-SCCHs from other Node Bs.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of transmitting control signals for uplink transmission of packet data, comprising:
   transmitting control signal data over a downlink control channel shared by a plurality of users in order to adjust or maintain a transmit rate at which a user is to transmit in an uplink, the downlink control channel including timeslots, each timeslot including a plurality of fields, each field including control signal data for an identified user for controlling uplink transmission of packet data by the identified user, the control signal data in each field including (1) an identifier uniquely identifying the identified user, (2) a first indicator specifying one of an acknowledgment and a negative acknowledgment of a packet transmitted by the identified user and (3) a second indicator specifying the transmit rate at which the identified user is to transmit in the uplink, the first indicator being a first bit value representing either the acknowledgment or the negative acknowledgment, the second indicator being a second bit value representing the transmit rate, the first and second indicators and the identifier being transmitted at the same time.

2. The method of claim 1, further comprising:
   assigning each user a particular field in the downlink control channel, in advance of transmitting the downlink control channel.

3. The method of claim 2, wherein the assigning step includes assigning each user a particular field with a given channelization code during a call setup procedure with the user.

4. The method of claim 1, wherein the number of users supported by the transmitted downlink control channel is based on one or more of a network signal-to-noise ratio value, an effective coding rate for the channel, and bit size of each field.

5. The method of claim 1, wherein the second indicator relates to a maximum transmit rate at which the user is to transmit in the uplink.

6. The method of claim 5, wherein the number of users supported by the transmitted downlink control channel is based on a size of the second bit value of the second indicator in each field.

7. The method of claim 5, wherein the user adjusts transmit rate or maintains transmit rate in the uplink based on the first and second bit values of the first indicator and the second indicator.

8. The method of claim 5, wherein the first bit value is an M-bit value and the second bit value is an N-bit value, N and M being different positive integers.

9. The method of claim 5, wherein the first and second bit values are N-bit values, N representing a positive integer greater than 1.

10. The method of claim 5, wherein the first and second bit values are 1-bit values.

11. The method of claim 1, wherein each user specific field is individually power controlled based on monitoring the first and second indicators in the user specific field.

12. A method for uplink transmission of packet data comprising:
   decoding a field received over a downlink control channel that is shared by a plurality of users in order to adjust or maintain a transmit rate at which a user is to transmit in an uplink, the shared downlink control channel including time slots, each time slot having a plurality of fields, each field including control signal data for an identified user for controlling uplink transmission, the control signal data in each field including (1) an identifier uniquely identifying the identified user, (2) a first indicator specifying one of an acknowledgment and a negative acknowledgment of a packet transmitted by the identified user and (3) a second indicator specifying the transmit rate at which the identified user is to transmit in the uplink, the first indicator being a first bit value representing either the acknowledgment or the negative acknowledgment, the second indicator being a second bit value representing the transmit rate, the first and second indicators and the identifier being transmitted at the same time; and transmitting packet data, from the identified user, in the uplink in accordance with the decoded control signal data.

13. The method of claim 12, wherein each user specific field is individually power controlled based on monitoring the first and second indicators in the user specific field.

14. The method of claim 12, wherein the number of users supported by the shared downlink control channel is based on one or more of a network signal-to-noise ratio value, an effective coding rate for the shared downlink control channel, and bit size of each field in the shared downlink control channel.

15. The method of claim 12, wherein each user is assigned a particular field in the shared downlink control channel by a network serving the users, in advance of receiving the shared downlink control channel.

16. The method of claim 15, wherein each user is assigned a particular field with a given channelization code during a call setup procedure with the network.

17. The method of claim 12, wherein each user is assigned a particular field in the shared downlink control channel by a base station serving the user, in advance of receiving the shared downlink control channel, the assigned field adapted to be modified by the serving base station.

18. The method of claim 12, wherein the second indicator relates to a maximum transmit rate at which the identified user is to transmit in the uplink.

19. The method of claim 18, wherein the identified user adjusts transmit rate or maintains transmit rate for uplink transmission based on the first and second bit values of the first indicator and the second indicator.

20. The method of claim 18, wherein the number of users supported by the shared downlink control channel is based on a size of the second bit value of the second indicator in each field.

* * * * *